United States Patent [19]

Rappas et al.

[11] 4,148,813

[45] Apr. 10, 1979

[54] NICKEL AND COBALT SOLVENT EXTRACTION WITH MERCAPTIDES

[75] Inventors: Alkis S. Rappas, Bedford; J. Paul Pemsler, Lexington, both of Mass.

[73] Assignee: Kennecott Copper Corporation, New York, N.Y.

[21] Appl. No.: 831,501

[22] Filed: Sep. 8, 1977

[51] Int. Cl.$^2$ .................... C07F 15/04; C07F 15/06
[52] U.S. Cl. .................... 260/439 R; 260/583 EE; 423/139; 423/149; 423/418; 75/101 BE
[58] Field of Search ............ 423/139, 149, 417, 418, 423/658.5, 140; 75/101 BE, 119; 260/439 R, 609 R, 561 S, 562 S, 583 EE

[56] References Cited

U.S. PATENT DOCUMENTS 2,191,753   2/1940   Coffman .................... 260/583 EE

OTHER PUBLICATIONS

Clingman, A. et al., "Selective Liquid Ion-Exchangers", *J. Appl. Chem.* 13, May 1963, pp. 193-198.
Mehrotra R., et al., "Thiol and Thio-β-Diketone Derivatives of Some Elements", *Inorganica Chimica Acta Reviews* (1968), pp. 111-116.
Swan, C. et al., "Complexes of Co, Ni, Tl, Pd with Some Mercapto Compounds", *Chemistry and Industry*, 8/12/67, pp. 1363-1364.

*Primary Examiner*—Brian Hearn
*Attorney, Agent, or Firm*—John L. Sniado; Anthony M. Lorusso

[57] ABSTRACT

A novel class of extractants and a method of using the extractants in the hydrometallurgical recovery of nickel and cobalt metal. The extractants comprise a water immiscible organic solvent system containing solubilized mercaptide anions. In an important embodiment of the invention, the mercaptide ions are generated by adding a mercaptan to a mixed water immiscible solvent comprising a basic compound such as an amine, preferably a tertiary amine, and a polar component such as an alcohol, whereby the mercaptan undergoes acid dissociation.

The extractants are used by being contacted with cobalt, nickel, or cobalt and nickel containing aqueous solutions. On mixing, the cobalt and/or nickel values are taken up by the organic as cobalt or nickel mercaptides. These may then be stripped of cobalt and nickel by treatment with an aqueous alkaline solution and carbon monoxide.

6 Claims, No Drawings

NICKEL AND COBALT SOLVENT EXTRACTION WITH MERCAPTIDES

BACKGROUND OF THE INVENTION

This invention relates to novel organic extractants for removing cobalt and nickel values from aqueous solutions.

It is known that nickel can be recovered from its concentrated acidic solutions by electrowinning. However, if the nickel solution is ammoniacal, or if the solution is too dilute, then the nickel ions must be extracted by liquid ion exchange and back extracted into a sulfuric acid solution before being electrowon. The purity of the nickel obtained from such a process is very sensitive to the nature and concentration of the impurities present in the solution.

It is also known that nickel can be obtained from its solutions by hydrogen reduction at elevated temperatures and pressures. Typically, nickel won by this method is very impure.

Because of the difficulties of the foregoing nickel recovery processes, carbonylation processes for recovering nickel and cobalt have recently been developed. In the carbonylation process, very pure nickel and cobalt of acceptable purity are obtained by treating nickel and cobalt values to produce carbonyl compounds. The gaseous compound $Ni(CO)_4$ is then isolated and thermally decomposed to yield pure metal pellets and carbon monoxide gas. The purity of the nickel metal pellets and carbon monoxide gas. The purity of the nickel metal produced by this process is excellent because of the selectivity of the carbonylation reaction and the fact that other metals often present with nickel do not form gaseous compounds.

SUMMARY OF THE INVENTION

The instant invention is based on the discovery that cobalt and nickel may be extracted from an aqueous phase to an organic phase by mercaptide anions solubilized in the organic phase in accordance with the equation:

$$2RS^-_{(Org)} + M^{++}_{(Aq)} \rightarrow M(RS)_{2(Org)}$$

where R is an organic moiety which renders the $RS^-$ anion substantially water insoluble and $M^{++}$ is $Co^{++}$ or $Ni^{++}$. In contrast, mercaptans (RSH) have been observed not to be capable of extracting cobalt or nickel, unless somehow dissociated to form the $RS^-$ ion.

The foregoing discovery provides a basis for the provision of a number of novel cobalt and nickel organic extractants and a cobalt and nickel extraction procedure. Three generalized embodiments of the extractant of the invention have been developed to date. All comprise a substantially water immiscible organic solvent system capable of solubilizing nickel and/or cobalt mercaptide and a compatible, substantially water insoluble mercaptide anion solubilized in the solvent system.

One important embodiment of the extractant of the invention comprises a substantially water immiscible organic solvent, at least one component of which is an organic amine, preferably a tertiary amine, and a water insoluble mercaptan. This combination of substances results in acid dissociation in accordance with the equation, e.g.:

$$RSH + R_3'N \rightleftharpoons RS^- + R_3'NH^+$$

to produce the required mercaptide anion in the organic phase. In this equation, R and R' are compatible organic moieties which render the $RS^-$ and the $R_3'N$ water insoluble. The three functionalities attached to the nitrogen atom in the amine may be the same or different. Furthermore, primary or secondary amines may be substituted for the tertiary amine. This extractant preferably contains another water immiscible solvent in addition to the amine, e.g., a polar solvent such as an alcohol. Preferred mercaptans for use in the foregoing extractant include mercaptans of the formula RSH where R is an alkyl group ($C_7$–$C_{20}$), aryl group, or lower alkyl ($C_1$–$C_6$) substituted aryl group. Dodecanethiol has been found to be particularly useful.

The presently preferred extractant contains an alkyl thiol such as dodecanethiol solvated in an organic solvent system. One important solvent system comprises 25–60 mole percent alcohol, 25–60 mole percent amine, and 0–33 mole percent inert diluent, e.g., kerosene, solvent naphtha, etc.

In the process of the invention, one of the foregoing extractants is contacted by an aqueous solution containing cobalt, nickel, or both, and at least a portion of the metal values are extracted into the organic phase as cobalt or nickel mercaptides.

Accordingly, it is an object of the invention to provide a class of mercaptide anion based cobalt and nickel extractants.

Another object is to provide solvent systems for an organic extractant which systems are capable of solvating mercaptide anion and nickel and cobalt mercaptides.

Another object of the invention is to provide organic, water immiscible extractants which exchange hydrogen ions for nickel and cobalt ions.

Still another object is to provide an organic extractant which can utilize commercially available, relatively inexpensive mercaptans.

Yet another object of the invention is to provide an extractant that results in cobalt and nickel mercaptides solvated in an organic phase, which mercaptides may be easily stripped of their metal values in the presence of carbon monoxide and an aqueous alkaline solution.

DESCRIPTION OF A PREFERRED EMBODIMENT

There are many sources of aqueous nickel and cobalt containing pregnant liquors which may be treated in accordance with the instant invention. Both ammoniacal and non-ammoniacal solutions of nickel and/or cobalt carbonate, sulfate, hydroxide, etc. may be successfully utilized. The presence of solubilized iron or copper in the solution to be treated by the extractant of the invention is detrimental since these ions compete with cobalt and nickel in the reactions upon which the extraction depends. Accordingly, it is contemplated that the best results will be achieved when the processes herein disclosed are operated downstream from a copper and/or iron extraction system. In this situation, the copper and iron free raffinate of the upstream system or systems makes an ideal liquor for use in the process of the instant invention. One particularly well suited copper removal process is disclosed in U.S. Pat. No. 4,033,765, entitled *Improvements in the Extraction of Copper from Solutions by Reduction with Anthraquinols* to John N. Gerlach. This process, in addition to removing copper from the solution, utilizes hydrogen as a reducing agent. Accordingly, it is contemplated that synthesis gas could be used to drive an overall copper, cobalt and nickel winning procedure, hydrogen being used to reduce the copper, and carbon monoxide being used in accordance with the instant process to produce cobalt and nickel.

Nonlimiting examples of liquors which may be treated by the process of the invention, methods for their production, and ores from which they may be obtained are disclosed in U.S. Pat. Nos. 3,772,423 to Stevens et al.; 2,576,314 to F. A. Forward; 2,726,934 to Forward et al.; 3,088,820 to Mackiw et al.; 3,644,144 to Vosahlova, and, perhaps most notably, 3,728,105 to R. R. Skarbo, which discloses a method of extracting nickel and cobalt from deep sea manganese nodules.

The processes of the invention require a water immiscible extractant comprising an organic solvent or solvent system and solubilized mercaptide anion. It has now been discovered that, as a general phenomenon, mercaptide anion having the general formula $RS^-$ is capable of complexing with nickel and cobalt when dissolved in an organic solvent to produce organic solvent soluble $(R-S)_2Ni$ and $(R-S)_2Co$. R can be any one of an extremely large number of organic radicals. An essential property of the radical selected for R is that it render both the mercaptide anions and the resulting nickel and cobalt mercaptides soluble in the organic solvent system selected. Thus, the mercaptide anion and the solvent system will be matched in accordance with the teachings herein disclosed to produce a homogeneous, water immiscible solution capable of removing nickel and cobalt ions from aqueous solutions and of solvating the nickel and cobalt mercaptides thereby produced.

As indicated above, the ability of the composition of matter of the invention to function as an extractant depends on the presence of mercaptide anion solubilized in the organic, water immiscible solvent. Mercaptans and mercaptide salts, if undissociated, cannot extract cobalt and nickel values. Thus, the solvent system and the mercaptan added to the system must be selected to effect dissociation so that mercaptide anion is present. In this regard, the solvent, or at least components thereof, act as something more than a diluent or carrier as with most conventional extractants and play an important role in the invention in that they are selected to induce the formation of mercaptide anion and to maintain the anion concentration.

At present, several general approaches to producing mercaptide anions in water immiscible organic solvents have been developed. One approach is disclosed in U.S. application Ser. No. 831,552, entitled *Amino-thiol Nickel and Cobalt Extractant and Method Of Use*, by A. S. Rappas et al., filed Sept. 8, 1977, the disclosure of which is incorporated herein by reference. Briefly, this extractant comprises a mercaptan which contains a primary, secondary, or tertiary amino group in its molecular structure which, when solubilized in a suitable, typically polar water immiscible organic solvent, undergoes an internal proton shift wherein the SH group dissociates and the hydrogen ion associates with the amino group to form a quaternary ammonium species.

Another approach is disclosed in U.S. application Ser. No. 831,553 entitled *Alkali Metal Mercaptide Organic Extractant and Method of Use* to A. S. Rappas et al., filed Sept. 8, 1977, the disclosure of which is incorporated herein by reference. In this extractant, the mercaptide anions are produced by solvating a sodium or potassium mercaptide in a specially designed water immiscible organic solvent capable of dissolving alkali metal ions.

The extractant of this invention comprises a substantially water insoluble mercaptan solubilized within a substantially water insoluble organic amine and preferably also includes a second compatible water immiscible organic solvent. This embodiment of the extractant depends on the ability of the amine to induce acid dissociation of the mercaptan so that mercaptide anions are produced in the organic solvent.

The mercaptans usable with this system can be essentially any mercaptan that is substantially water insoluble, many of which are commercially available and inexpensive. Thus, operable mercaptans include compounds having the formula RSH wherein R is selected from among cyclic, linear, or branch chained hydrocarbons, either substituted or unsubstituted, aromatic compounds, and various amines, ketones, and thiols, and mixtures thereof. Specific compounds which have been found operable include $\alpha$ toluene mercaptan, cyclohexanethiol, 1-dodecanethiol, p-toluene mercaptan, 2-naphthalenethiol, p-methoxy $\alpha$-toluenethiol, p-chloro-$\alpha$-toluenethiol, triphenyl methyl mercaptan, and 3-phenyl propyl mercaptan. Dodecanethiol is the presently preferred mercaptan.

To promote efficiency, the mercaptide ion should be highly insoluble in water, non-volatile, and free of double or triple bonds or other chemically active functional groups which might affect its stability.

The preferred method of stripping cobalt and nickel values from the loaded extractant is by exposing the extractant to an aqueous alkaline solution and carbon monoxide. Such treatment results in cobalt and nickel carbonyl compounds which are easily treated to produce pure nickel and cobalt, and in organic solvated alkali metal mercaptide. Accordingly, the mercaptide anions selected for use in the process disclosed herein should also form nickel and cobalt complexes which are easily stripped of their nickel and cobalt ions in the presence of carbon monoxide but should otherwise be inert to carbon monoxide, nickel carbonyl or carbonyl cobaltate. Furthermore, the mercaptide should ideally be selected such that it may be stripped of metal values in the presence of as dilute a concentration of alkali as possible. Also, the pH of the pregnant liquor to be treated will affect the decision as to which particular mercaptide anion should be selected. Obviously, any particular mercaptide anion utilized will represent a compromise among the foregoing properties.

In the presence of an amine, the foregoing mercaptans undergo acid dissociation to produce the mercaptide anion in the organic solvent. The identity of the organic solvent is not particularly significant, except insofar as it is capable of solvating the nickel and cobalt mercaptide produced. However, it is preferred that the solvent be a polar solvent or a solvent system which includes one or more polar solvents. Examples of such solvents include alcohols such as octanol, 2 ethyl hexanol, decyl alcohol, and the like, phenols such as nonyl phenol, and amides such as m acetotoluidide, N-methylbutyramide and N-methyl-propionamide. Such solvents can be used alone, in mixture, or can be diluted with, for example, kerosene, xylene, toluene, solvent naphtha, etc. Best results have been observed to be achieved when the solvent system contains at least 20% by volume water insoluble alcohol. Of course, the lower the molecular weight of the particular alcohol selected, the higher, for a fixed percent volume, the polar group to nickel or cobalt molar ratio will be and the higher will be the alcohol's water solubility. Accordingly, ideal alcohols are those which are substantially water insoluble yet have as low a molecular weight as possible.

Excellent results have been achieved with an extractant comprising solubilized mercaptan in a solution having three components in the mole ratio set forth below.

| alcohol | .25–.60 |
|---------|---------|
| amine | .25–.60 |
| other solvent | 0–.33 |

10–15 grams of nickel can be loaded per liter of organic if the extractant comprises 8–12 moles of organic amine, 0–12 moles of water insoluble alcohol, and 0–8 moles of inert diluent.

Nonlimiting examples of the "other solvent" which acts as a diluent in the extractants set forth above include xylene, toluene, kerosene, cyclohexane, 4-methyl cyclohexanol, 2-ethyl hexanol, octanol and decanol.

Amines which have been found to be suitable include the commercially available Adogen 364, Adogen 381, Adogen 382 (Ashland Chemical Co.), Primine JMT (Rohm & Haas) and amines such as N,N diethylcyclohexylamine, benzyl methyl amine, 2,6-diisopropylaniline, tri-N-octylamine, and N,N-dimethylbenzylamine. The foregoing is by no means an exhausted list as will be apparent in view of the function of the amine in the extractant.

If any of the foregoing extractants are contacted by cobalt and/or nickel containing aqueous solutions, organic solvent soluble nickel and cobalt mercaptides are produced. In general, at the temperature of the extraction (usually 40°–70° C.), there is a maximum possible metal loading in the organic phase in the range of 2–20 grams per liter of organic. For each mole of nickel or cobalt to be picked up in the organic phase, there should be at least 2.5 moles of $RS^-$ ion in the organic phase. The concentration of mercaptide anion may be up to the saturation point.

It has also been discovered that the loaded extractant containing nickel and/or cobalt mercaptide can be stripped of its cobalt and nickel content by exposing the loaded extractant to an aqueous alkaline solution, e.g., an NaOH, KOH, or $Ca(OH)_2$ solution, and carbon monoxide. Advantageously, stripping in this manner results in cobalt and nickel carbonyl compounds, typically gaseous nickel tetracarbonyl and water soluble carbonyl cobaltate salts. As is known, these substances are easily converted to valuable nickel and cobalt compounds or to extremely pure nickel and cobalt of acceptable purity. The extractants of this invention undergo carbonylate stripping with solutions containing only 12 to 120 g/l sodium hydroxide or potassium hydroxide, and 50–160 g/l sodium carbonate. This is in contrast to the alkali solution required to strip the cobalt and nickel mercaptide loaded extractant of the alkali metal mercaptide type extractant mentioned above, wherein a solution comprising greater than 30% by weight sodium hydroxide is required for reasonable reaction rates. Furthermore, the extractant disclosed herein can be stripped using carbon monoxide and an aqueous suspension of $Ca(OH)_2$ of about 40 g/l.

One economically desirable aspect of stripping the loaded extractant with carbon monoxide as disclosed above is that such treatment simultaneously regenerates the mercaptide anion, which is produced in its alkali metal salt form. In general, it is preferred to exchange hydrogen for the alkali metal cations prior to reusing the extractant, as otherwise alkali metal ions are lost to the cobalt and nickel-free raffinate. A hydrogen ion exchange can be effected by treating the alkali metal mercaptide containing organic with an aqueous acidic solution. The preferred method of exchange is to treat the solution with carbonic acid, resulting in water soluble sodium carbonate from which NaOH can be regenerated by treatment with calcium oxide, thus conserving alkali.

Exemplary chemistry of the above-identified process is set forth below.

Extraction

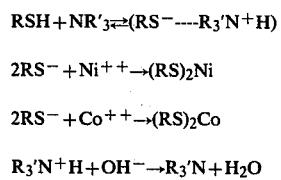

$$2RS^- + Ni^{++} \rightarrow (RS)_2Ni$$

$$2RS^- + Co^{++} \rightarrow (RS)_2Co$$

$$R_3'N^+H + OH^- \rightarrow R_3'N + H_2O$$

Carbonylate Stripping

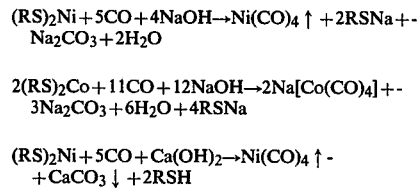

$$2(RS)_2Co + 11CO + 12NaOH \rightarrow 2Na[Co(CO)_4] + 3Na_2CO_3 + 6H_2O + 4RSNa$$

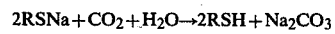

Extractant Regeneration $$2RSNa + CO_2 + H_2O \rightarrow 2RSH + Na_2CO_3$$

Caustic Regeneration

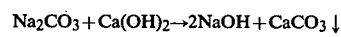

A process which utilizes the above-described organic, water immiscible extractant to recover cobalt and nickel metal is disclosed in detail in U.S. Pat. No. 4,097,272 entitled *Method of Winning Nickel and Cobalt*, by A. S. Rappas et al. the disclosure of which is incorporated herein by reference.

One of the primary advantages of the process of the instant invention is that the foregoing reactions can take place at or close to ambient temperatures and pressures. However, as is well known, solubility is a temperature dependent phenomenon. Accordingly, if necessary, the extraction can be run at temperatures greater than 50° C. (e.g., up to 100° to 150° C.). Furthermore, a pressure of 2 to 3 atmospheres is tolerable. That the reactions occur at moderate temperatures and pressures is important because no autoclaves need be employed.

In general, the pH of the cobalt and nickel containing solution to be treated should not be below about 3.5. In this regard, the optimum pH depends on the acid dissociation constant of the particular mercaptan selected. Thus, when the acid dissociation reaction is RSH⇌RS⁻+H⁺, the acid dissociation contact $K_a$ will be:

$$K_a = [RS^-][H^+]/[RSH]$$

Since RS⁻ is responsible for the extraction and since, for a given mercaptan, $K_a$ is a constant, it is obvious that the pH of the aqueous solution will affect the RS⁻ concentration. Accordingly, in general, the greater the H⁺ concentration, the smaller will be the RS⁻ concentration.

However, the extraction is possible at the low pH set forth above because of the presence of organic amines of high basicity in the organic phase. In this regard, there is a dissociation in the organic phase as well as a hydrolysis of the quaternary ammonium ions produced as a by-product which regenerates the organic soluble amine. Once nickel or cobalt mercaptide is formed, it is removed from the equilibria and the process continues although at a slower rate.

As can be appreciated from the above, nickel tetracarbonyl and tetracarbonyl cobaltate ions are produced as a result of the carbonylate stripping. Advantageously, nickel tetracarbonyl is a gaseous compound which may be removed from the reaction together with excess carbon monoxide. Normally, there will be no other metal present which can form gaseous compounds under the stripping conditions. Consequently, the nickel carbonyl, if subsequently broken down into nickel metal and carbon monoxide, produces an extremely pure nickel product. As is known in the art, nickel tetracarbonyl in the carbon monoxide off gas stream can be concentrated, e.g., condensed under pressure or absorbed into a suitable solvent such as the type disclosed in U.S. Pat. No. 3,688,474 to M. D. Head et al. Once concentrated, the nickel carbonyl is easily thermally decomposed to pure nickel metal and carbon monoxide gas which may be recycled.

The tetracarbonyl cobaltate formed during the carbonylate stripping of cobalt from the organic phase is soluble in the alkaline aqueous phase but insoluble in the organic phase. Accordingly, cobalt values in aqueous solution may be isolated from the organic phase via a liquid-liquid separation.

Laboratory experiments have demonstrated the technical feasibility of the extraction of cobalt and nickel from pregnant liquors using various extractants of the types described herein and of the carbonylate stripping to yield nickel tetracarbonyl and tetracarbonyl cobaltate. In these experiments, the nickel carbonyl was transported in the carbon monoxide stream and oxidized in a series of nitric acid filled scrubbers. The amount of nickel transported as nickel tetracarbonyl was determined by atomic absorption of the scrubbing solution. The amount of cobalt recovered as tetracarbonyl cobaltate from the alkaline carbonylate stripping solution was determined by atomic absorption. Subsequently, the aqueous solutions were oxidized with air. The solid compounds formed were collected by filtration, dissolved in a strong oxidizing acid mixture, and their cobalt content determined by atomic absorption.

The invention will be further understood from the following nonlimiting examples.

In the examples which follow, extractants containing a mercaptan, an organic amine, and at least one other solvent as a diluent were mixed in the proportions indicated at 50°–60° C. under an argon atmosphere. The extractants were tested for their ability to absorb cobalt or nickel from aqueous solutions. Unless otherwise specified, the stock aqueous nickel solution used in the tests contained 3.8 g/l nickel and included ammonia and ammonium carbonate such that the pH was approximately equal to 10.8. The cobalt solutions were prepared by adding 0.84 ml. of a cobalt sulfate stock solution (62.5 g/l Co) to 46.16 ml. of a nickel and copper-free solution containing ammonia, ammonium carbonate, and trace amounts of chloride and sodium.

The extractions were carried out in a batch reactor under an inert atmosphere and the nickel or cobalt concentration was determined in both aqueous and organic phases by atomic absorption. The amount of extractant used, unless otherwise indicated, is expressed as the mole ratio of a particular component in the extractant to the nickel or cobalt contained in the aqueous phase prior to contacting the two phases. The duration of the extractions varied between 5 minutes and 2 hours. Usually, equilibrium was reached relatively quickly (5–15 minutes, depending on mixing, temperature, etc.). The temperature at which the extractions were conducted and the resulting amount of nickel or cobalt loading are set forth in the tables below.

EXAMPLE 1

| Component | Vol. % | Moles of Component / Mole of Ni |
|---|---|---|
| 1. α toluenethiol | 4.88 | 2.4 |
| 2. 2,6-diisopropylanaline | 35.34 | 11.0 |
| 3. decanol | 34.97 | 10.8 |
| 4. xylene | 24.81 | 9.1 |

T = 62° C.
Organic loading = 2.24g Ni/l

EXAMPLE 2

| Component | Vol. % | Moles of Component / Mole of Ni |
|---|---|---|
| 1. α toluenethiol | 4.88 | 2.4 |
| 2. dibenzylamine | 36.03 | 11.0 |
| 3. decanol | 35.08 | 10.8 |
| 4. xylene | 24.01 | 8.8 |

T = 60° C.
Organic loading = 1.61g Ni/l

EXAMPLE 3

| Component | Vol. % | Moles of Component / Mole of Ni |
|---|---|---|
| 1. α toluenethiol | 6.10 | 3.0 |
| 2. 2,6-diisopropylanaline | 38.55 | 12.0 |
| 3. decanol | 38.99 | 12.0 |
| 4. xylene | 16.36 | 6.0 |

T = 56° C.
Organic loading = 4.48g Ni/l

EXAMPLE 4

| Component | Vol. % | Moles of Component / Mole of Ni |
|---|---|---|
| 1. α toluenethiol | 6.10 | 3.0 |
| 2. N,N-diethylcyclohexylamine | 37.34 | 12.0 |
| 3. decanol | 38.99 | 12.0 |

-continued

| Component | Vol. % | Moles of Component Mole of Ni |
|---|---|---|
| 4. xylene | 17.57 | 6.4 |

T = 56° C.
Organic loading = 6.50g Ni/l

EXAMPLE 5

| Component | Vol. % | Moles of Component Mole of Ni |
|---|---|---|
| 1. α toluenethiol | 6.1 | 3.0 |
| 2. N,N-dimethylbenzylamine | 18.41 | 12.0 |
| 3. decanol | 38.99 | 12.0 |
| 4. xylene | 36.50 | 13.3 |

T = 56° C.
Organic loading = 5.15g Ni/l

EXAMPLE 6

| Component | Vol. % | Moles of Component Mole of Ni |
|---|---|---|
| 1. α toluenethiol | 6.1 | 3.0 |
| 2. benzylmethylamine | 26.38 | 12.0 |
| 3. decanol | 38.99 | 12.0 |
| 4. xylene | 28.53 | 10.4 |

T = 56° C.
Organic loading = 7.49g Ni/l

EXAMPLE 7

| Component | Vol. % | Moles of Component Mole of Ni |
|---|---|---|
| 1. dodecanethiol | 10.66 | 2.6 |
| 2. Adogen 382 (Ashland Co.) | 55.4 | 6.0 |
| 3. decanol | 33.9 | 15.1 |

T = 60° C.
Organic loading = 2.57g Ni/l

EXAMPLE 8

| Component | Vol. % | Moles of Component Mole of Ni |
|---|---|---|
| 1. dodecanethiol | 10.66 | 2.6 |
| 2. Adogen 382 | 55.4 | 6.0 |
| 3. decanol | 33.9 | 15.1 |

T = 60° C., pH = 3.5, Stirring time = 2 hrs.
Organic loading = 4.55g Ni/l

EXAMPLE 9

| Component | Vol. % | Moles of Component Mole of Ni |
|---|---|---|
| 1. 2-naphthalenethiol | 7.0 | 3.0 |
| 2. N,N-diethylcylohexylamine | 37.34 | 12.0 |
| 3. decanol | 38.99 | 12.0 |
| 4. xylene | 16.67 | 6.1 |

T = 57° C., pH = 10.85
Organic loading = 10.16g Ni/l

EXAMPLE 10

| Component | Vol. % | Moles of Component Mole of Ni |
|---|---|---|
| 1. 2-naphthalenethiol | 7.0 | 3.0 |
| 2. 2,6-diisopropylanaline | 38.5 | 12.0 |
| 3. decanol | 38.9 | 12.0 |
| 4. xylene | 15.46 | 5.6 |

T = 57° C., pH = 10.85
Organic loading = 6.8g Ni/l

EXAMPLE 11

| Component | Vol. % | Moles of Component Mole of Ni |
|---|---|---|
| 1. 2-naphthalenethiol | 7.0 | 3.0 |
| 2. N,N-dimethylbenzylamine | 18.4 | 12.0 |
| 3. decanol | 38.9 | 12.0 |
| 4. xylene | 35.6 | 13.0 |

EXAMPLE 12

| Component | Vol. % | Moles of Component Mole of Ni |
|---|---|---|
| 1. 2 naphthalenethiol | 5.6 | 3.0 |
| 2. Adogen 364 (Ashland) | 53.01 | 8.0 |
| 3. decanol | 20.8 | 8.0 |
| 4. xylene | 20.6 | 9.4 |

T = 55° C.
Organic loading = 10.57g Ni/l

EXAMPLE 13

| Component | Vol. % | Moles of Component Mole of Ni (or Co) |
|---|---|---|
| 1. 2-N-decylaminoethanethiol | 10.2 | 3.0 |
| 2. Adogen 364 | 18.8 | 3.0 |
| 3. decanol | 52.9 | 20.4 |
| 4. xylene | 16.9 | 7.7 |

T = 55° C.
Organic loading = 9.8g Ni/l

EXAMPLE 14

| Component | Vol. % | Moles of Component Mole of Ni (or Co) |
|---|---|---|
| 1. 2-N-decylaminoethanethiol | 12.78 | 3.0 |
| 2. N,N-dimethylbenzylamine | 18.41 | 12.0 |
| 3. decanol | 38.99 | 12.0 |
| 4. xylene | 29.82 | 10.9 |

T = 55° C.
Organic loading = 11.2g Ni/l

EXAMPLE 15

| Component | Vol. % | Moles of Component Mole of Ni (or Co) |
|---|---|---|
| 1. 2-N-decylaminoethanethiol | 2.04 | 2.4 |
| 2. Primene JMT (Rohm & Haas) | 26.95 | 22.0 |
| 3. Adogen 382 (Asland) | 53.88 | 28.9 |

-continued

| Component | Vol. % | Moles of Component Mole of Ni (or Co) |
|---|---|---|
| 4. decanol | 17.12 | 26.4 |

T = 50° C., pH = 10.5
Organic loading 1.19g Co/l

EXAMPLE 16

| Component | Vol. % | Moles of Component Mole of Co |
|---|---|---|
| 1. 2-N-decylaminoethanethiol | 2.04 | 2.4 |
| 2. Primene JMT | 2.93 | 2.4 |
| 3. Adogen 382 | 8.19 | 4.4 |
| 4. decanol | 86.83 | 133.8 |

T = 50° C., pH = 10.5
Organic loading 1.29g Co/l

Copper or iron ions, if present in the pregnant liquors compete with nickel and cobalt for association with the mercaptide ion in the extractant. Copper is not stripped by carbon monoxide and accordingly, would have to be bled out. Iron, in general, is believed to follow the cobalt chemistry. There are many known methods of separating iron and cobalt carbonyl.

The invention may be embodied in other specific forms without departing from the spirit and essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A process for extracting metal values selected from the group consisting of nickel and cobalt from aqueous solutions containing ions of at least one of said metal values into an organic solvent, said process comprising the steps of:
providing an extractant comprising a solution of a water immiscible organic solvent containing mercaptide anions solubilized therein, said solvent being capable of solubilizing nickel and cobalt mercaptides; and,
contacting the aqueous solution with a pH not below 3.5 with the extractant for a sufficient amount of time to extract a portion of at least one of said metals from the aqueous solution into the organic solvent.

2. The process as set forth in claim 1 wherein the organic solvent comprises a water insoluble organic amine and wherein the solubilized mercaptide anion is provided by adding a water insoluble mercaptan to the organic solvent so that the mercaptan undergoes acid dissociation in the solvent.

3. The process as set forth in claim 2 wherein the organic amine is a tertiary amine.

4. The process as set forth in claim 2 wherein the organic solvent comprises a water immiscible alcohol.

5. The process as set forth in claim 2 wherein the water insoluble mercaptan comprises dodecanethiol.

6. The process as set forth in claim 1 wherein the solvent comprises a mixture of mutually miscible organic compounds.

* * * * *